US009240694B2

(12) United States Patent
Tsuchida et al.

(10) Patent No.: US 9,240,694 B2
(45) Date of Patent: Jan. 19, 2016

(54) METHOD FOR CHARGING BATTERY AND CHARGE CONTROL DEVICE FOR BATTERY

(75) Inventors: Yasushi Tsuchida, Susono (JP);
Shigenori Hama, Sunto-gun (JP);
Masahiro Kawamura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 14/123,233

(22) PCT Filed: Jun. 10, 2011

(86) PCT No.: PCT/JP2011/063368
§ 371 (c)(1),
(2), (4) Date: Dec. 2, 2013

(87) PCT Pub. No.: WO2012/169066
PCT Pub. Date: Dec. 13, 2012

(65) Prior Publication Data
US 2014/0097800 A1    Apr. 10, 2014

(51) Int. Cl.
*H02J 7/04* (2006.01)
*H02J 7/00* (2006.01)
*H01M 10/052* (2010.01)
*H01M 10/0562* (2010.01)
*H01M 10/44* (2006.01)

(52) U.S. Cl.
CPC .......... *H02J 7/0029* (2013.01); *H01M 10/052* (2013.01); *H01M 10/0562* (2013.01); *H01M 10/443* (2013.01); *Y02E 60/122* (2013.01); *Y02T 10/7011* (2013.01)

(58) Field of Classification Search
CPC ...... H02J 7/0031; H02J 7/0047; Y02E 60/12; G01R 31/3648; H01M 10/48
USPC .......................................... 320/136
See application file for complete search history.

(56) References Cited

U.S. PATENT DOCUMENTS

| | | | |
|---|---|---|---|
| 5,252,411 A | 10/1993 | Yokokawa et al. | |
| 2001/0017533 A1* | 8/2001 | Kaite et al. | 320/132 |
| 2003/0132730 A1* | 7/2003 | Ochiai | 320/104 |
| 2004/0245235 A1* | 12/2004 | Kishi et al. | 219/216 |
| 2009/0251104 A1* | 10/2009 | Yamamoto et al. | 320/134 |

FOREIGN PATENT DOCUMENTS

| | | |
|---|---|---|
| JP | A-4-137371 | 5/1992 |
| JP | A-2000-113909 | 4/2000 |
| JP | A-2010-225581 | 10/2010 |
| JP | A-2010-225582 | 10/2010 |
| JP | A-2012-248414 | 12/2012 |
| WO | WO 2012/164366 A2 | 12/2012 |

* cited by examiner

*Primary Examiner* — Arun Williams
(74) *Attorney, Agent, or Firm* — Oliff PLC (57) ABSTRACT

A method for charging a battery is used for charging a solid secondary battery including a positive electrode active material layer, a negative electrode active material layer and a solid electrolyte layer formed between the positive electrode active material layer and the negative electrode active material layer. Specifically, the method for charging a battery includes a process for obtaining or estimating temperature of the solid secondary battery; and an over-discharge process for lowering voltage of the solid secondary battery to or below a rated voltage by performing over-discharge and/or making an external short circuit with respect to the solid secondary battery prior to a process for charging the solid secondary battery, provided that the temperature is equal to or higher than a predetermined temperature.

2 Claims, 5 Drawing Sheets

METHOD FOR CHARGING BATTERY AND CHARGE CONTROL DEVICE FOR BATTERY

TECHNICAL FIELD

The present invention relates to a technical field of a charging control over a solid secondary battery.

BACKGROUND TECHNIQUE

Along with a rapid spread of information relevant apparatuses and communication apparatuses such as a personal computer, a video camera and a portable telephone in recent years, the development of a battery to be utilized as a power source thereof has been emphasized. Also in the automobile industry, the development of a high-output and high-capacity battery for an electric automobile or a hybrid automobile has been advanced. A lithium secondary battery has been presently noticed from the viewpoint of a high energy density among various kinds of batteries.

Since liquid electrolyte containing a flammable organic solvent is used for a presently commercialized lithium secondary battery, it is necessary to install a safety device for restraining temperature rise during a short circuit and to improve the structure and the material for preventing the short circuit. On the contrary, a lithium solid secondary battery all-solidified by replacing the liquid electrolyte with a solid electrolyte layer is considered to have an advantage of the simplification of the safety device and to be excellent in production cost and productivity because it does not need any flammable organic solvent therein.

A secondary battery can be repeatedly charged and discharged, but it is also known that the battery performance thereof could deteriorate through over-discharge process. Thus, a normal secondary battery has a structure for measuring the voltage of the battery during the discharge in order to stop the discharge at a predetermined voltage. In the meantime, Patent Reference-1 discloses a battery module which does not have any over-discharge protecting means for preventing the over-discharge of the lithium secondary battery, and Patent Reference-2 discloses an electrical apparatus which does not have any over-discharge protecting means for preventing the over-discharge of the lithium secondary battery.

PRECEDING TECHNICAL DOCUMENTS

Patent Reference

Patent Reference-1: Japanese Patent Application Laid-open under No. 2010-225581
Patent Reference-2: Japanese Patent Application Laid-open under No. 2010-225582

DISCLOSURE OF INVENTION

Problem to be Solved by the Invention

A solid secondary battery has a defect that increase of the internal resistance thereof due to repeats of charge and discharge could lead to deterioration of the output performance thereof. A solid secondary battery has another defect that increase of the internal resistance thereof due to high temperature (e.g., 60° C.) preservation could lead to deterioration of the output performance thereof. Furthermore, the recovery of the deteriorated output performance is generally difficult.

The present invention has been achieved in order to solve the above problem. It is a main object of this invention to provide a method for charging a battery and a charge control device for a battery capable of efficiently performing the recovery of the output performance of the battery and the charge of the battery.

Means for Solving the Problem

As a result of hard work by the inventors in order to achieve the above-mentioned object, a knowledge is obtained that positively (purposely) performing the over-discharge process is effective for the recovery of the deteriorated output performance contrary to expectations. The present invention is based on the above-mentioned knowledge.

According to one aspect of the present invention, there is provided a method for charging a battery, the method being used for charging a solid secondary battery including a positive electrode active material layer, a negative electrode active material layer and a solid electrolyte layer formed between the positive electrode active material layer and the negative electrode active material layer, the method including: a process for obtaining or estimating temperature of the solid secondary battery; and an over-discharge process for lowering voltage of the solid secondary battery to a voltage not higher than a rated voltage by performing over-discharge and/or making an external short circuit with respect to the solid secondary battery prior to a process for charging the solid secondary battery, provided that the temperature is equal to or higher than a predetermined temperature.

The above method for charging a battery is preferably used for charging a solid secondary battery (i.e., an all solid state battery or an inorganic solid electrolyte battery). At a first process, the temperature of the solid secondary battery is obtained or estimated. The term "obtain" herein includes not only directly detecting the temperature of the solid secondary battery, but also detecting or measuring a representative value of the temperature of the solid secondary battery. Next, the over-discharge process is performed when the temperature of the solid secondary battery is equal to or higher than a predetermined temperature. The over-discharge process is performed prior to the process for charging the solid secondary battery. Specifically, in the over-discharge process, at least one process (i.e., over-discharging process) selected from the over-discharge and the external short circuit with respect to the solid secondary battery is performed so that the voltage of the solid secondary battery decreases to the voltage not higher than a rated voltage. In this way, by performing the over-discharge process only when the temperature of the solid secondary battery is equal to or higher than a predetermined temperature, the prolongation of the time for recovering the output performance of the solid secondary battery can be suppressed. In other words, it is possible to promptly recover the output performance of the solid secondary battery and to efficiently perform the charge of the solid secondary battery.

In a manner of the method for charging a battery, in the over-discharge process, the voltage of the solid secondary battery is held at the voltage not higher than the rated voltage for a time determined in accordance with the temperature of the solid secondary battery.

In this manner, the control is performed in consideration of the fact that the time needed for the recovery of the output performance by the retention of the voltage of the solid secondary battery at the voltage not higher than the rated voltage varies depending on the temperature of the solid secondary battery. Thereby, it is possible to more efficiently perform the recovery of the output performance of the solid secondary battery and the charge of the solid secondary battery.

Regarding the method for charging a battery, preferably, in the over-discharge process, the higher the temperature of the solid secondary battery is, the shorter the time of holding the voltage of the solid secondary battery at the voltage not higher than the rated voltage becomes.

According to another aspect of the present invention, there is provided a charge control device for a battery, the device being used for charging a solid secondary battery including a positive electrode active material layer, a negative electrode active material layer and a solid electrolyte layer formed between the positive electrode active material layer and the negative electrode active material layer, the device including: an unit configured to obtain or estimate temperature of the solid secondary battery; and an over-discharge unit configured to lower voltage of the solid secondary battery to a voltage not higher than a rated voltage by performing over-discharge and/or making an external short circuit with respect to the solid secondary battery prior to a process for charging the solid secondary battery, provided that the temperature is equal to or higher than a predetermined temperature.

According to the above charge control device for a battery, it is also possible to promptly recover the output performance of the solid secondary battery and to efficiently perform the charge of the solid secondary battery.

DETAILED DESCRIPTION OF THE PREFERRED EMBODIMENTS

A preferred embodiment of the present invention will be explained hereinafter with reference to the drawings.

<Configuration of Hybrid Vehicle>

Figure 1:
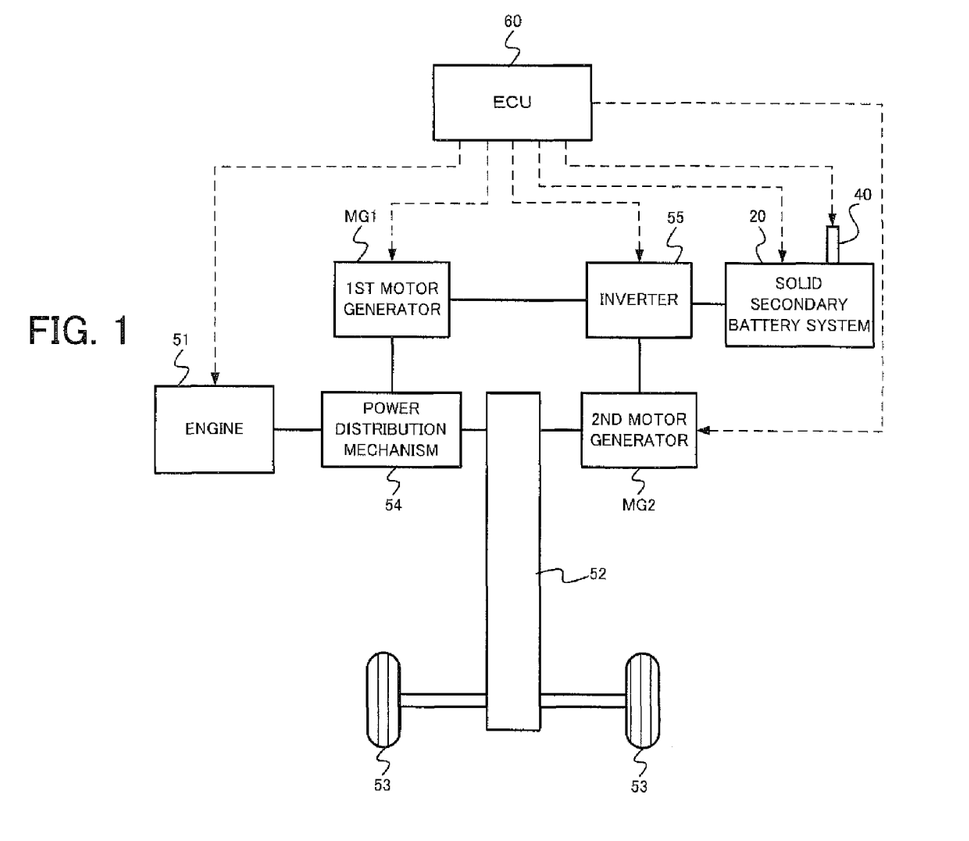
FIG. 1 illustrates a schematic configuration of a hybrid vehicle according to the embodiment.

FIG. 1 shows a schematic configuration of a hybrid vehicle 100 on which a charge control device for a battery according to the embodiment is installed. In FIG. 1, broken arrows indicate the input/output of signals.

The hybrid vehicle 100 mainly includes an engine (internal combustion engine) 51, an axle 52, wheels 53, a first motor generator MG1, a second motor generator MG2, a power distribution mechanism 54, an inverter 55, a solid secondary battery system 20 including a solid secondary battery which is not shown and an ECU (Electronic Control Unit) 60.

The axle 52 is a part of a power transmission system which transmits the power of the engine 51 and the second motor generator MG2 to the wheels 53. The wheels 53 are the wheels of the hybrid vehicle 100, and FIG. 1 especially shows only the right and the left front wheels to simplify the explanation. The engine 51 is a gasoline engine, for example, and functions as a power source for outputting major driving force of the hybrid vehicle 100. Various controls over the engine 51 are performed by the ECU 60.

The first motor generator MG1 is configured to mainly function as a generator to charge the solid secondary battery of the solid secondary battery system 20 or as a generator to supply the electric power to the second motor generator MG2, and generates electricity by use of the output of the engine 51. The second motor generator MG2 is configured to mainly function as an electric motor to assist the output of the engine 51. In addition, the second motor generator MG2 functions as a regenerative brake at the time of braking by an engine brake or a foot brake, and generates electricity through the regenerative driving. Each of the above-mentioned motor generators MG1 and MG2 is configured as a synchronous motor generator, for example, and includes a rotor having a plurality of permanent magnets on the outer circumferential surface and a stator around which three-phase coils forming rotating magnetic field are wound.

The power distribution mechanism 54 corresponds to the planetary gear having a sun gear and a ring gear, and is configured to distribute the output of the engine 51 to the first motor generator MG1 and the axle 52.

The inverter 55 is a DC/AC converter which controls the input/output of the electric power between the solid secondary battery of the solid secondary battery system 20 and each of the first and the second motor generators MG1 and MG2. For example, the inverter 55 converts the AC electric power generated by the first motor generator MG1 to the DC electric power and supplies it to the solid secondary battery. In addition, the inverter 55 converts the DC electric power taken out from the solid secondary battery to the AC electric power and supplies it to the second motor generator MG2.

The solid secondary battery of the solid secondary battery system 20 is configured to function as a power supply to drive the first motor generator MG1 and/or the second motor generator MG2, and also configured to charge the electric power generated by the first motor generator MG1 and/or the second motor generator MG2. The solid secondary battery is also equipped with a temperature sensor 40 capable of detecting the battery temperature (i.e., cell temperature). The temperature sensor 40 provides the ECU 60 with a detection signal corresponding to the detected battery temperature.

The ECU 60 includes a CPU (Central Processing Unit), a ROM (Read Only Memory) and a RAM (Random Access Memory) which are not shown, and executes various controls to each constitutional elements in the hybrid vehicle 100. For example, the ECU 60 includes a hybrid ECU, an engine ECU and a motor ECU. The ECU 60 is an example of "the over-discharge process" as the detail thereof is described later.

It is noted that the present invention can also be applied to a so-called plug-in hybrid electric vehicle driven by use of electricity obtained from external power source, although in the above description there is presented an example in which the present invention is applied to a hybrid vehicle.

<Solid Secondary Battery System>

Next, the solid secondary battery system 20 in the embodiment will be described.

Figure 2:
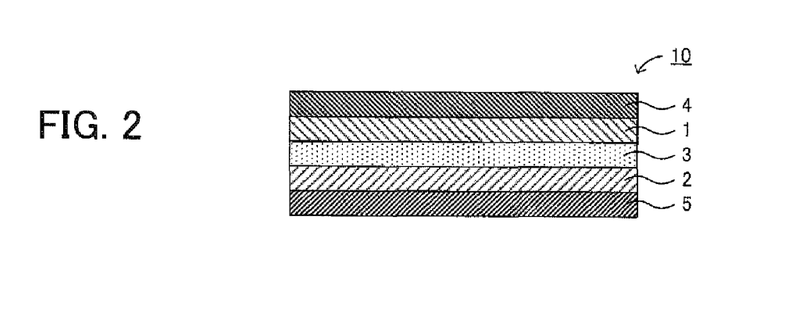
FIG. 2 is a schematic cross-section diagram illustrating an example of the solid secondary battery in the embodiment.

FIG. 2 is a schematic cross-section diagram illustrating an example of the solid secondary battery in the embodiment. The solid secondary battery 10 illustrated in FIG. 2 includes a positive electrode active material layer 1, a negative electrode active material layer 2, a solid electrolyte layer 3 formed between the positive electrode active material layer 1 and the negative electrode active material layer 2, a positive electrode current collector 4 for performing current collecting of the positive electrode active material layer 1 and a negative electrode current collector 5 for performing current collecting of the negative electrode active material layer 2.

Figure 3:
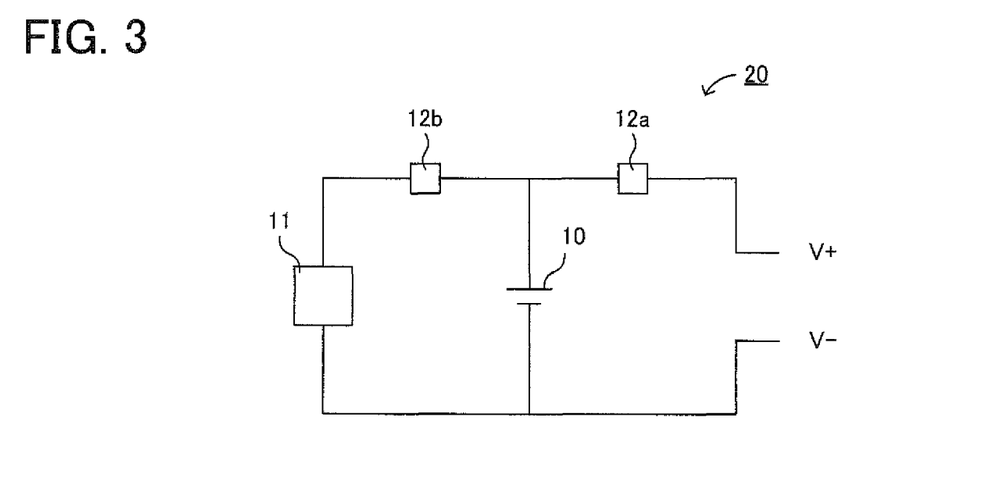
FIG. 3 is a schematic diagram illustrating an example of the solid secondary battery system in the embodiment.

FIG. 3 is a schematic diagram illustrating an example of the solid secondary battery system in the embodiment. The solid secondary battery system 20 illustrated in FIG. 3 includes a solid secondary battery 10, an over-discharge process unit 11 and switching units 12a and 12b.

The over-discharge process unit 11 performs over-discharge process for getting the solid secondary battery 10 in the over-discharge state. Specifically, the over-discharge process unit 11 performs over-discharge and/or makes an external short circuit with respect to the solid secondary battery 10. In one example, the over-discharge process unit 11 is configured by a circuit including at least a resistor and makes an external short circuit of the solid secondary battery 10. In another example, the over-discharge process unit 11 is configured by a discharge device (discharge and charge device) and discharges the solid secondary battery 10 until the voltage thereof becomes 0V, for example. In still another example, the over-discharge process unit 11 discharges the solid secondary battery 10 so that the polarity inversion thereof occurs (i.e., the voltage becomes negative).

The term "external short circuit" herein indicates short-circuiting the positive electrode active material layer 1 and the negative electrode active material layer 2 via an external circuit. The term "over-discharge state" herein indicates a state where the voltage of the solid secondary battery 10 is equal to or lower than a rated voltage. Examples of the over-discharge state includes a state where the voltage of the solid secondary battery 10 is approximately 0V and a state where the state of charge of the solid secondary battery 10 is approximately 0%. In this specification, the term "over-discharge process" includes making an external short circuit by use of a resistor and performing over-discharge by use of a discharge device.

The switching units 12a and 12b are controlled by the above-mentioned ECU 60. When the switching unit 12a is in the on position and the switching unit 12b is in the off position, the motor generator MG and the auxiliary machinery in the hybrid vehicle 100 are driven by the electricity of the solid secondary battery 10. In contrast, when the switching unit 12a is in the off position and the switching unit 12b is in the on position, the over-discharge process is performed by the over-discharge process unit 11. Namely, at least one of the over-discharge and the external short circuit with respect to the solid secondary battery 10 is performed.

Figure 4:
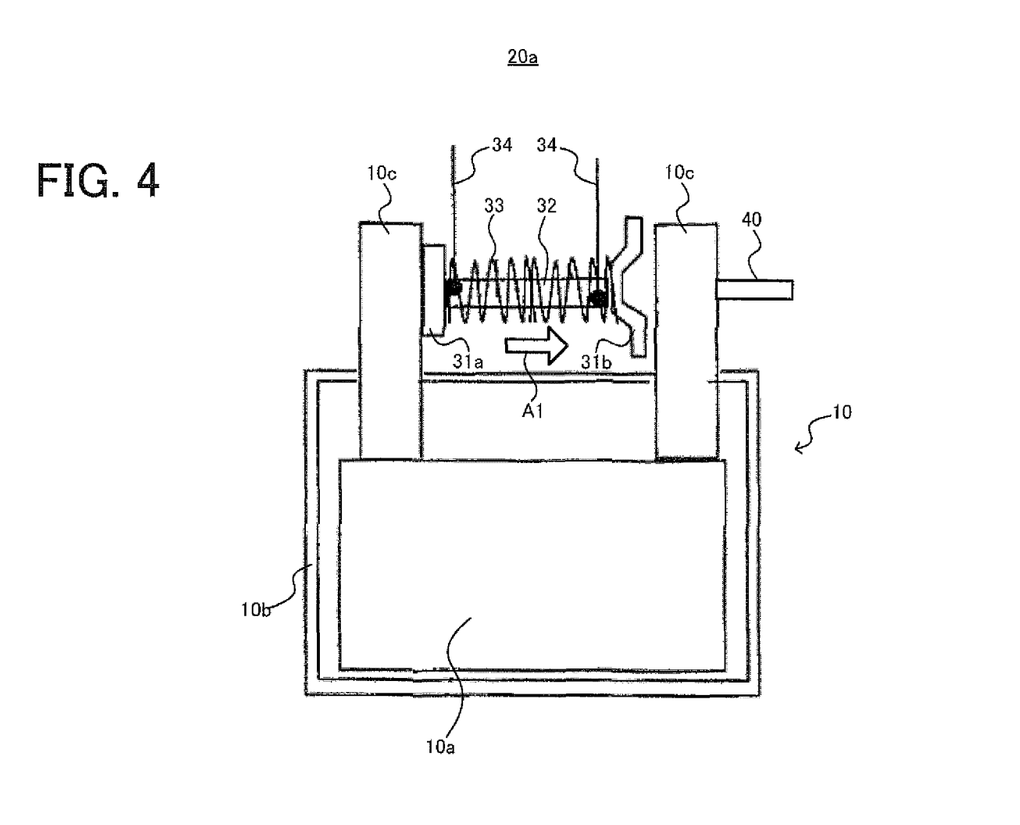
FIG. 4 illustrates a schematic cross-section diagram of a concrete example of the solid secondary battery system.

A description will be given of the concrete example of the above-mentioned solid secondary battery system 20 with reference to FIG. 4. FIG. 4 illustrates a schematic cross-section diagram of the solid secondary battery system 20a. The solid secondary battery system 20a illustrated in FIG. 4 includes the solid secondary battery 10, fixing metal plates 31a and 31b, a piezo-electric element 32, a resistor coil 33 and conducting wires 34. The solid secondary battery 10 includes an electrode body 10a, a battery case 10b and terminals 10c. The electrode body 10a includes the positive electrode active material layer 1, the negative electrode active material layer 2, the solid electrolyte layer 3, the positive electrode current collector 4 and the negative electrode current collector 5, as described above. On one of the terminals 10c, the above-mentioned temperature sensor 40 is provided.

The fixing metal plate 31a is connected to one of the terminals 10c whereas the fixing metal plate 31b is away from the terminals 10c in a state where no voltage is applied to the piezo-electric element 32. The conducting wires 34 supplies some voltage to the piezo-electric element 32, and the piezo-electric element 32 extends in the direction indicated by the arrow A1 when the voltage is applied to the piezo-electric element 32. Thereby, the fixing metal plate 31b comes to contact with the terminal 10c, and the resistor coil 33 becomes in contact with the two terminals 10c via the fixing metal plates 31a and 31b. This state corresponds to a state where the external short circuit of the solid secondary battery 10 is made.

It is noted that the fixing metal plates 31a and 31b and the piezo-electric element 32 correspond to the above-mentioned switching unit 12b, and the resistor coil 33 corresponds to the over-discharge process unit 11. The ECU 60 performs the control of applying the voltage to the piezo-electric element 32 via conducting wire 34 thereby to make the external short circuit (i.e., perform the over-discharge process) of the solid secondary battery 10.

According to the above-mentioned embodiment, by providing the over-discharge process unit 11, it is possible to reduce the internal resistance and to recover the output performance. This leads to prolongation of the life cycle of the solid secondary battery 10. Conventionally, it is commonly known that over-discharge leads to deterioration of the output performance of a battery. Thus, a normal solid secondary battery has some over-discharge protecting means for protecting the over-discharge. In contrast, according to the embodiment, by voluntarily performing the over-discharge process with respect to the solid secondary battery 10 deteriorated through charge and discharge cycles, it is possible to reduce the internal resistance and to recover the output performance.

The mechanism for reducing the internal resistance through the over-discharge process is inferred as follows. In the solid secondary battery 10, the battery reaction occurs in the solid or on the solid interface, and this causes generation of a new film (SEI: Solid Electrolyte Interface) on the interface. Since the film has high resistance, the internal resistance comes to increase as a result. In contrast, according to the embodiment, by performing the over-discharge process, it is possible to remove the film and to reduce the internal resistance. The film could be generated in any solid or on any solid interface of the solid secondary battery 10, but supposedly, many of them are generated especially on the interface between the active material and the solid electrolyte material. This is because the active material has an active reaction, i.e., discharge of the absorbed metallic ions on the surface thereof, and the solid electrolyte material usually has a large contact area with the active material. In particular, in a case where a pair of the active material and the solid electrolyte material derives from different kinds of compounds from each other, it is considered that the film is likely to come into existence. In one example, an oxide active material (which derives from oxide) and a sulfide solid electrolyte material (which derives from sulfide) are relatively easy to react to each other, and therefore it is considered that the film is likely to come into existence.

<Control Method>

Next, the control method executed by the ECU 60 in the embodiment will be described below. In this embodiment, when the battery temperature of the solid secondary battery 10 is equal to or higher than a predetermined temperature, the ECU 60 performs a control of lowering the voltage (hereinafter simply referred to as "battery voltage") of the solid secondary battery 10 before the charge of the solid secondary battery 10 so that the battery voltage is equal to or lower than a rated voltage. Namely, if the battery temperature is equal to or higher than a predetermined temperature, the ECU 60 charges the battery after the over-discharge process. On the other hand, if the battery temperature is lower than the predetermined temperature, the ECU 60 immediately charges the solid secondary battery 10 without the over-discharge process.

Specifically, when the battery temperature is equal to or higher than a predetermined temperature, the ECU 60 controls the battery voltage to be equal to or lower than the rated voltage before the charge of the solid secondary battery 10. For example, the ECU 60 holds the battery voltage at 0V. In this case, the ECU 60 continues the control of holding the battery voltage at a voltage not higher than the rated voltage during the time determined in accordance with the battery temperature. In other words, in accordance with the battery temperature, the ECU 60 changes the time (hereinafter referred to as "holding time") to hold the battery voltage at the voltage not higher than the rated voltage. In particular, the ECU 60 shortens the holding time in a case of high battery temperature compared to a case of low battery temperature.

Figure 5:
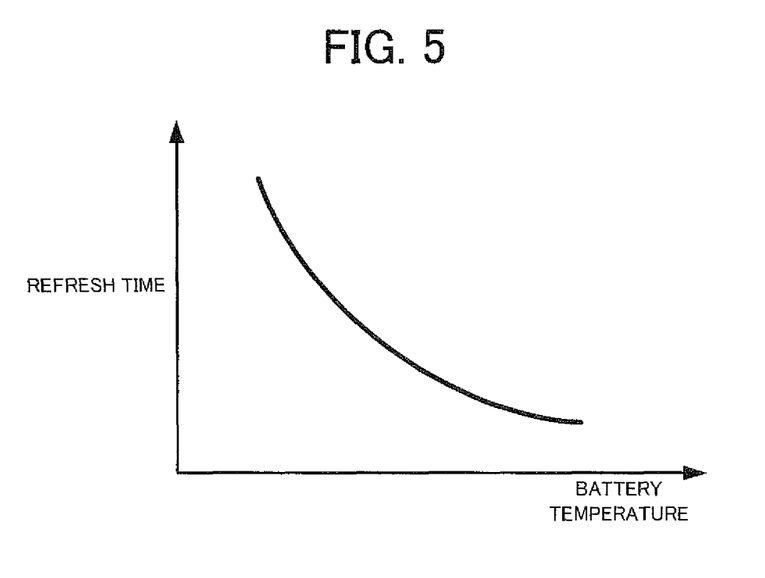
FIG. 5 is a diagram for concretely explaining the control method in the embodiment.

The reasons for performing the above-mentioned control will be described with reference to FIG. 5. FIG. 5 schematically illustrates a relationship between the battery temperature and the refresh time. The term "refresh time" herein indicates the time (i.e., the holding time) to lower the resistance of the solid secondary battery 10 to a value not higher than a predetermined value by holding the battery voltage at a voltage (e.g., 0V) equal to or lower than the rated voltage. The relationship between the battery temperature and the refresh time as illustrated in FIG. 5 can be obtained through experiments conducted by use of various values of the battery temperature and various values of the holding time, for example.

According to FIG. 5, the higher the battery temperature is, the shorter the refresh time becomes (i.e., the lower the battery temperature is, the longer the refresh time becomes). Supposedly, this is because the higher the battery temperature is, the higher the speed to remove the film (SEI) of the solid secondary battery 10 becomes and the earlier the internal resistance decreases. In such a state that the internal resistance has decreased, the output performance has already recovered, and therefore the charge of the solid secondary battery 10 can be efficiently performed.

Thus, in the embodiment, the ECU 60 performs the control of the over-discharge process and the charge in consideration of the relationship between the battery temperature and the refresh time. Specifically, in the embodiment, only in a case of the battery temperature corresponding to the relatively short refresh time, i.e., only in a case of such a battery temperature that the necessary time is relatively short to lower the internal resistance of the solid secondary battery 10 through the over-discharge process to a value not higher than a predetermined value, the ECU 60 performs the control of holding the battery voltage at the voltage not higher than a rated voltage prior to the charge of the solid secondary battery 10. Thereby, it is possible to prevent the prolongation of the time needed for recovering the output performance of the solid secondary battery 10. Namely, it is possible to promptly recover the output performance of the solid secondary battery 10. In addition, by charging the solid secondary battery 10 whose output performance has already recovered, it is also possible to efficiently charge the solid secondary battery 10.

In addition, in the embodiment, the ECU 60 performs the control of holding the battery voltage at the voltage not higher than the rated voltage during the holding time determined in accordance with the relationship between the battery temperature and the refresh time as illustrated in FIG. 5. Specifically, a map of each holding time to be used for each battery temperature is prepared based on the relationship between the battery temperature and the refresh time in advance, and the ECU 60 obtains the holding time corresponding to the present battery temperature with reference to the above-mentioned map thereby to perform the control of holding the battery voltage at the voltage not higher than the rated voltage. Thereby, it is possible to more efficiently perform the recovery of the output performance of the solid secondary battery 10 and the charge of the solid secondary battery 10. In one example, the refresh time can be used as the holding time, and in another example, the time slightly shorter or longer than the refresh time can be used as the holding time.

Next, with reference to FIG. 6, the flow of the control according to the embodiment will be described below. The flow of the control is repeatedly executed by the ECU 60 in a predetermined cycle.

At step 101, the ECU 60 determines whether or not the solid secondary battery 10 can be charged. For example, if the solid secondary battery 10 has been fully charged, the ECU 60 determines that the solid secondary battery 10 cannot be charged.

If the solid secondary battery 10 can be charged (step S101; Yes), the process goes to step S102. If the solid secondary battery 10 cannot be charged (step S101; No), the process ends. At step S102, the ECU 60 obtains the temperature (battery temperature) of the solid secondary battery 10 detected by the temperature sensor 40. Then, the process goes to step S103.

At step S103, the ECU 60 determines whether or not the battery temperature is equal to or higher than a predetermined temperature. In this case, the ECU 60 determines whether or not the battery temperature is within a range that the refresh time is relatively short, i.e., the battery temperature is within such a range that the necessary time is relatively short to lower the internal resistance of the solid secondary battery 10 through the over-discharge process to the value not higher than a predetermined value. In one example, the predetermined temperature can be determined based on the battery temperature corresponding to the refresh time equal to or shorter than a predetermined time, the refresh time being determined by the relationship illustrated in FIG. 5. In another example, considering the fact that the charge of the solid secondary battery 10 tends to be performed after the use of the electricity, the predetermined temperature is determined based on the estimated battery temperature after the use of the electricity of the solid secondary battery 10. Preferably, 30° C. is used as the predetermined temperature.

When the battery temperature is equal to or higher than the predetermined temperature (step S103; Yes), the process goes to step S104. In contrast, when the battery temperature is lower than the predetermined temperature (step S103; No), the process proceeds with step S107. In this case, the ECU 60 starts to charge the solid secondary battery 10 without performing the control of holding the battery voltage at the voltage not higher than the rated voltage (i.e., without performing the over-discharge process) (step S107). Then, the process ends.

At step S104, with reference to the map in which the above-mentioned battery temperature is associated with the holding time, the ECU 60 obtains the holding time corresponding to the battery temperature obtained at step S102. Then, the process goes to step S105.

At step S105, the ECU 60 performs the control of holding the battery voltage at the voltage not higher than the rated voltage. Preferably, the ECU 60 performs the control of holding the battery voltage at 0V. In one example, if the over-discharge process unit 11 performs the external short circuit, the ECU 60 performs the control of keeping the solid secondary battery 10 in the state of the external short circuit. In another example, if the over-discharge process unit 11 is a discharge device, the ECU 60 performs the control of continuing the constant-voltage discharge (CV discharge) to hold the battery voltage at 0V. Then, the process goes to step S106. It is noted that the ECU 60 may perform the control of holding the battery voltage at 0V after once having the battery voltage lowered through the over-discharge by means of the discharge device, if the battery voltage is high to some extent at the start time of the process at step S105.

At step S106, the ECU 60 determines whether or not the holding time obtained at step S104 has already passed. If the holding time has not passed yet (step S106; No), the process goes back to step S105 and the ECU 60 continues the control of holding the battery voltage at the voltage not higher than the rated voltage. In contrast, if the holding time has already passed (step S106; Yes), the ECU 60 terminates the control of holding the battery voltage at the voltage not higher than the rated voltage, and starts to charge the solid secondary battery 10 (step S107). Then, the process ends.

According to the above-explained flow of the control, it is possible to efficiently perform the recovery of the output performance of the solid secondary battery 10 and the charge of the solid secondary battery 10.

<Modification of Control Method>

Hereinafter, a description will be given of modifications of the above-mentioned control method.

Figure 6:
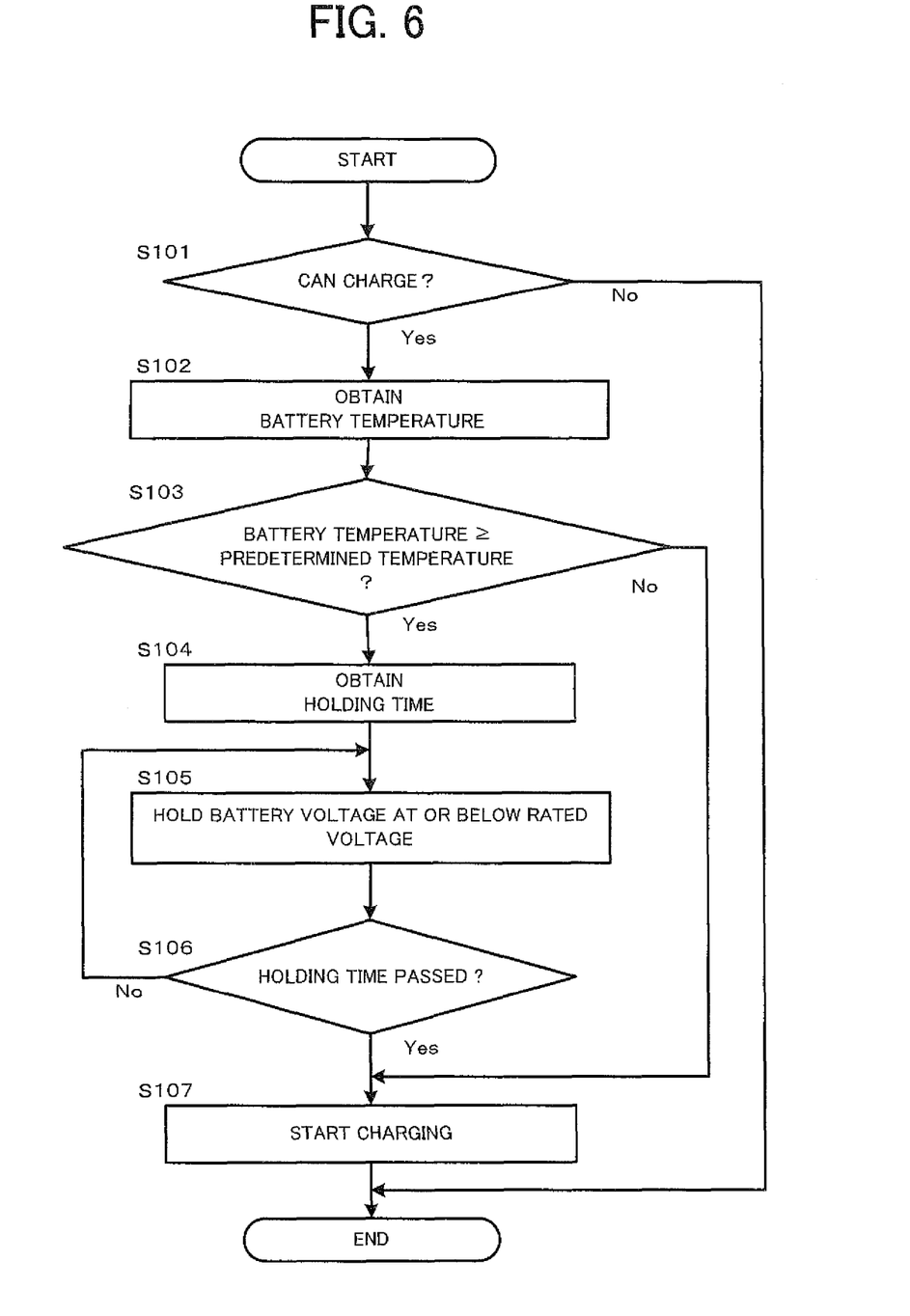
FIG. 6 illustrates a flow of the control in the embodiment.

FIG. 6 indicates an example of the control of holding the battery voltage at the voltage not higher than the rated voltage without changing the holding time (i.e., while fixing the holding time) after obtaining the holding time determined in accordance with the battery temperature. In another example, considering the variation of the battery temperature during the control, the ECU 60 may perform the control of holding the battery voltage at the voltage not higher than the rated voltage by using the holding time changed in accordance with the variation of the battery temperature. Thereby, it is possible to more efficiently perform the recovery of the output performance and the charge.

In the above-mentioned description, the example of the control of holding the battery voltage at 0V is explained, but holding the battery voltage at 0V is not necessarily needed if the voltage is equal to or lower than the rated voltage determined for each battery.

In the above-mentioned description, the example of the control of holding the battery voltage after lowering the battery voltage to a voltage not higher than the rated voltage. Instead, without performing the control of holding the battery voltage, the ECU 60 may only perform the control of lowering the battery voltage to a voltage not higher than the rated voltage. For example, the ECU 60 may only perform the control of lowering the battery voltage to 0V.

In the above-mentioned description, the example in which the temperature (battery temperature) of the solid secondary battery 10 is directly detected by the temperature sensor 40 is explained, but in another example, the battery temperature may be detected in an indirect manner. Specifically, a representative value of the battery voltage may be detected. In still another example, instead of detecting the battery temperature by the sensor in the above-mentioned way, the battery temperature may be estimated on the basis of a predetermined arithmetic expression or a map.

EXAMPLES

The present invention is described more specifically while showing examples and comparative examples hereinafter.

Example 1

Synthesis of Sulfide Solid Electrolyte Material

Lithium sulfide ($Li_2S$, manufactured by Nippon Chemical Industrial Co., Ltd.) and phosphorus pentasulfide ($P_2S_5$, manufactured by Sigma-Aldrich Co., Ltd.) were used as starting materials. Each of $Li_2S$ and $P_2S_5$ was weighed in a glove box under Ar atmosphere (a dew point of −70° C.) so as to become a molar ratio of 75 $Li_2S.25P_2S_5$ ($Li_3PS_4$, an ortho composition). The mixture of these material weighed by 2 g was mixed by use of an agate mortar. Thereafter, the obtained mixture weighed by 2 g was projected into a vessel of a planetary ball mill (45 cc, made of $ZrO_2$) and dehydrated Heptane (the water amount was equal to or smaller than 30 ppm) weighed by 4 g was projected thereinto and $ZrO_2$ ball (0=5 mm) weighed by 53 g was projected thereinto to hermetically seal the vessel completely (an Ar atmosphere). This vessel was mounted on a planetary ball milling machine (P7 manufactured by Fritsch Co., Ltd.) to perform mechanical milling for 40 hours at the number of rotating table revolutions of 500 rpm. Thereafter, the obtained sample was dried on a hot plate so as to remove Heptane, and a sulfide solid electrolyte material (glass with 75 $Li_2S.25P_2S_5$) is obtained.

It is noted that an oxide, a nitride and a halide may be used for the solid electrolyte material as well as a sulfide, and that a crystal composition, a non-crystalline composition and a glass ceramics may be also used for the solid electrolyte material.

(Producing Solid Secondary Battery)

$LiNi_{1/3}Co_{1/3}Mn_{1/3}O_2$ (positive electrode active material, manufactured by Nichia Co., Ltd.), VGCF (vapor grown carbon fiber, conductive material, manufactured by Showa Denko Co., Ltd) and the above-mentioned sulfide solid electrolyte material were weighed by 12.03 mg, 0.51 mg and 5.03 mg respectively and they were mixed. Thereby, a positive electrode mix was obtained. In addition, graphite (negative electrode active material, manufactured by Mitsui chemicals Co., Ltd.) and the above-mentioned sulfide solid electrolyte material were weighed by 9.06 mg and 8.24 mg respectively and they were mixed. Thereby, a negative electrode mix was obtained.

Next, the above-mentioned sulfide solid electrolyte material weighed by 18 mg was put in a mold having 1 $cm^2$ and pressed by 1 $ton/cm^2$. Thereby, a solid electrolyte layer was formed. On one side of the obtained solid electrolyte layer, the above-mentioned positive electrode mix weighed by 17.57 mg was added and pressed by 1 $ton/cm^2$. Thereby, the positive electrode active material layer was formed. Next, on the other side of the solid electrolyte layer, the above-mentioned negative electrode mix weighed by 17.3 mg was added and pressed by 4 $ton/cm^2$. Thereby, an element for generating electricity was obtained. Aluminum foil (manufactured by Nippon Foil Mfg. Co., Ltd.) weighed by 15 μm was used as a positive electrode current collector, and copper foil (manufactured by Nippon Foil Mfg. Co., Ltd.) weighed by 10 μm was used as a negative electrode current collector. Thereby, a solid secondary battery was obtained.

It is noted that the positive electrode is not limited to the above-mentioned material if it is an active material which can be used for a lithium ion battery. A laminated positive electrode active material such as $LiCoO_2$ and $LiNiO_2$, an olivine-type positive electrode active material and a spinel-type positive electrode active material can be also used. As the conductive assistant of the positive electrode, a carbon material and a metallic material can be used as well as VGCF. In addition, the negative electrode is not limited to the above-mentioned material if it is an active material which can be used for a lithium ion battery. It is also not a necessary condition that the above-mentioned foil is used for the current collector.

(Over Discharge Process)

After producing the solid secondary battery, the CC discharge with 1.5 mA had been performed by the time of 0V, and the CV discharge had been performed for ten hours at 0V. Then, after the confirmation that the open circuit voltage was equal to or lower than 0.5 V, the solid secondary battery had been held at 80° C. for 15 minutes.

The current value used for the CC discharge is not limited to the above-mentioned current value. In this regard, however, the CC discharge with a small current value takes a lot of time, and as the current value is large, the overvoltage becomes large. Thus, preferably, it is within a range of 0.1 mAh to 10 mAh, for example.

(Measurement of Resistance)

After the over-discharge process, CC charge with 0.3 mA had been performed by the time of 4.2V, and thereafter the CC discharge with 0.3 mA had been performed by the time of 2.5 V. Next, after the control of the voltage to 3.6 V through the charge, impedance analyses were performed by use of an impedance analyzer (manufactured by Solartron Co., Ltd.) to obtain the resistance. The result thereof will be described later.

Example 2

In Example 2, the solid secondary battery had been held at 60° C. for 60 minutes in the over-discharge process. Other conditions were the same as Example 1.

Example 3

In Example 3, the solid secondary battery had been held at 40° C. for 240 minutes in the over-discharge process. Other conditions were the same as Example 1.

Example 4

In Example 4, the solid secondary battery had been held at 30° C. for 450 minutes in the over-discharge process. Other conditions were the same as Example 1.

Comparative Example 1

In Comparative Example 1, the solid secondary battery had been held at 25° C. for 15 minutes in the over-discharge process. Other conditions were the same as Example 1.

Comparative Example 2

In Comparative Example 2, the solid secondary battery had been held at 25° C. for 600 minutes in the over-discharge process. Other conditions were the same as Example 1.

[Comparison of Resistance]

Figure 7:
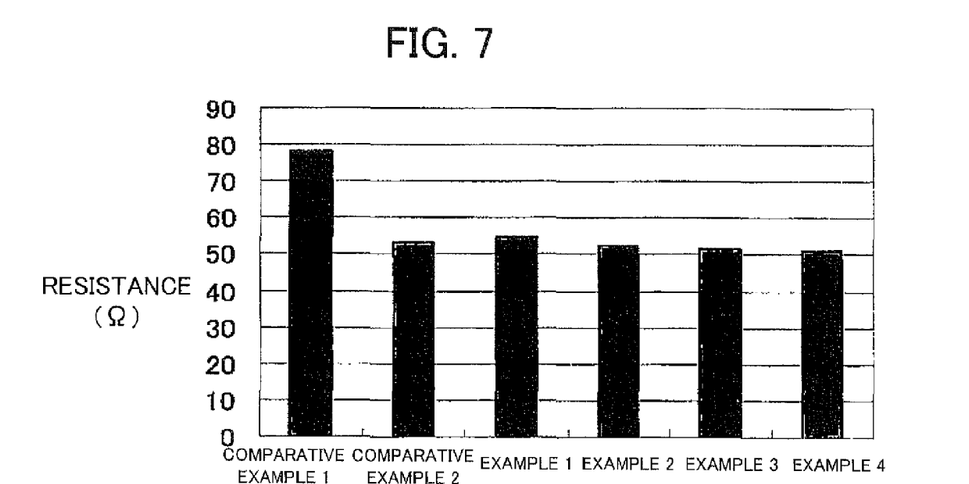
FIG. 7 illustrates an example of the results of Examples 1 to 4 and Comparative Examples 1 to 2.

FIG. 7 illustrates an example indicating results of Example 1 to Example 4 and Comparative Example 1 and Comparative Example 2 mentioned above. FIG. 7 indicates the appropriate decrease of the resistance of the solid secondary battery in Example 1 to Example 4 and Comparative Example 2. Supposedly, this is because the state of the solid secondary battery was kept for an appropriate time determined in accordance with the battery temperature in Example 1 to Example 4 and Comparative Example 2. In contrast, in Comparative Example 1, it can be recognized that the resistance of the solid secondary battery did not decrease very much. Supposedly, this is because the state of the solid secondary battery was not kept for an appropriate time determined in accordance with the battery temperature in Comparative Example 1. Specifically, it is considered to be due to the fact that the holding time was too short.

[Relationship Between Battery Temperature and Refresh Time]

Figure 8:
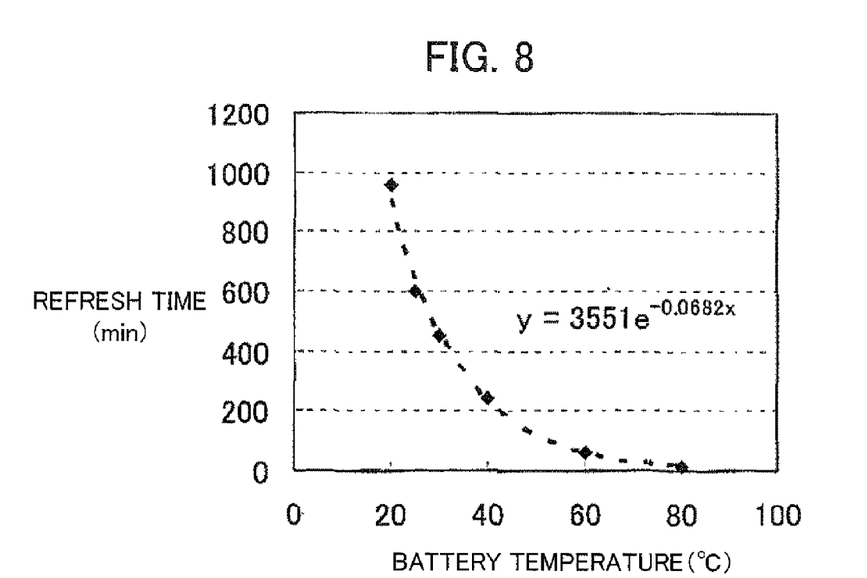
FIG. 8 illustrates a relationship between the battery temperature and the refresh time.

FIG. 8 illustrates an example indicating a relationship between the battery temperature and the refresh time. The above-mentioned relationship can be obtained through experiments by use of various battery temperatures and various holding times. According to FIG. 8, it was confirmed that the higher the battery temperature was, the shorter the refresh time became. In other words, it was confirmed that the lower the battery temperature was, the longer the refresh time became. On the basis of these results, the holding time used in the above-mentioned control is determined.

INDUSTRIAL APPLICABILITY

This invention can be used for charging a solid secondary battery.

BRIEF DESCRIPTION OF THE REFERENCE NUMBER

1 Positive electrode active material layer
2 Negative electrode active material layer
3 Solid electrolyte layer
4 Positive electrode current collector
5 Negative electrode current collector
10 Solid secondary battery
11 Over-discharge process unit
12*a*, 12*b* Switching units
20 Solid secondary battery system
40 Temperature Sensor
60 ECU
100 Hybrid vehicle

The invention claimed is:

1. A method for charging a battery, the method being used for charging a solid secondary battery including a positive electrode active material layer, a negative electrode active material layer and a solid electrolyte layer formed between the positive electrode active material layer and the negative electrode active material layer, the method comprising:
   a process for obtaining or estimating temperature of the solid secondary battery; and
   an over-discharge process for lowering voltage of the solid secondary battery to not higher than a rated voltage by performing over-discharge and/or making an external short circuit with respect to the solid secondary battery prior to a process for charging the solid secondary battery, provided that the temperature is equal to or higher than a predetermined temperature,
   wherein in the over-discharge process, the voltage of the solid secondary battery is held at a voltage not higher than the rated voltage for a time determined in accordance with the temperature of the solid secondary battery such that, the higher the temperature of the solid secondary battery, the shorter the time of holding the voltage of the solid secondary battery at not higher than the rated voltage.

2. A charge control device for a battery, the device being used for charging a solid secondary battery including a positive electrode active material layer, a negative electrode active material layer and a solid electrolyte layer formed between the positive electrode active material layer and the negative electrode active material layer, the device comprising:
   an unit configured to obtain or estimate temperature of the solid secondary battery; and
   an over-discharge unit configured to lower voltage of the solid secondary battery to not higher than a rated voltage by performing over-discharge and/or making an external short circuit with respect to the solid secondary battery prior to a process for charging the solid secondary battery, provided that the temperature is equal to or higher than a predetermined temperature,
   wherein the over-discharge unit holds the voltage of the solid secondary battery at a voltage not higher than the rated voltage for a time determined in accordance with the temperature of the solid secondary battery such that, the higher the temperature of the solid secondary battery, the shorter the time of holding the voltage of the solid secondary battery at not higher than the rated voltage.

* * * * *